April 26, 1938. L. A. MAJNERI 2,115,174
FLUID PRESSURE CONTROL MECHANISM
Filed Oct. 6, 1933 2 Sheets-Sheet 2
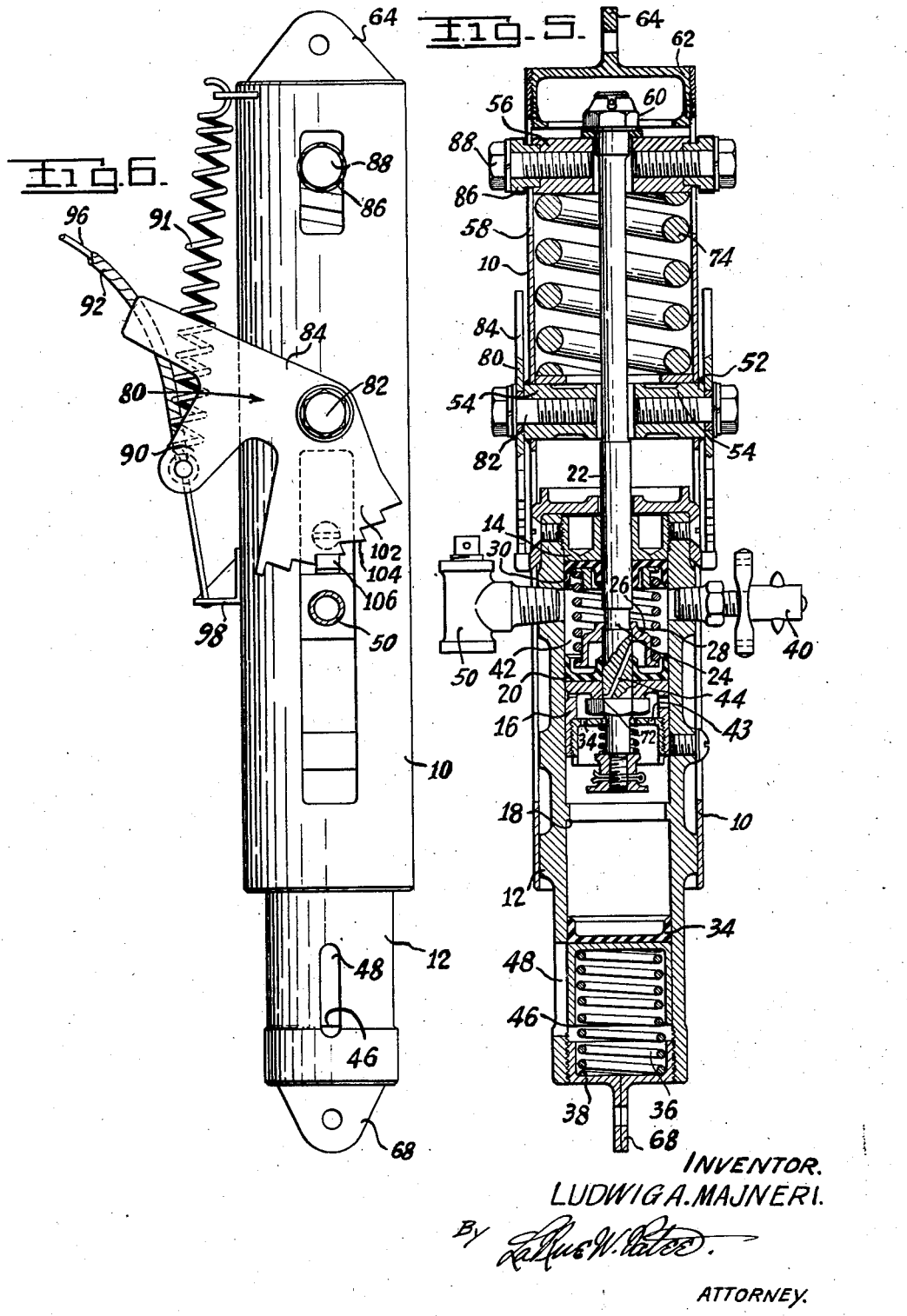
INVENTOR.
LUDWIG A. MAJNERI.
By
ATTORNEY.

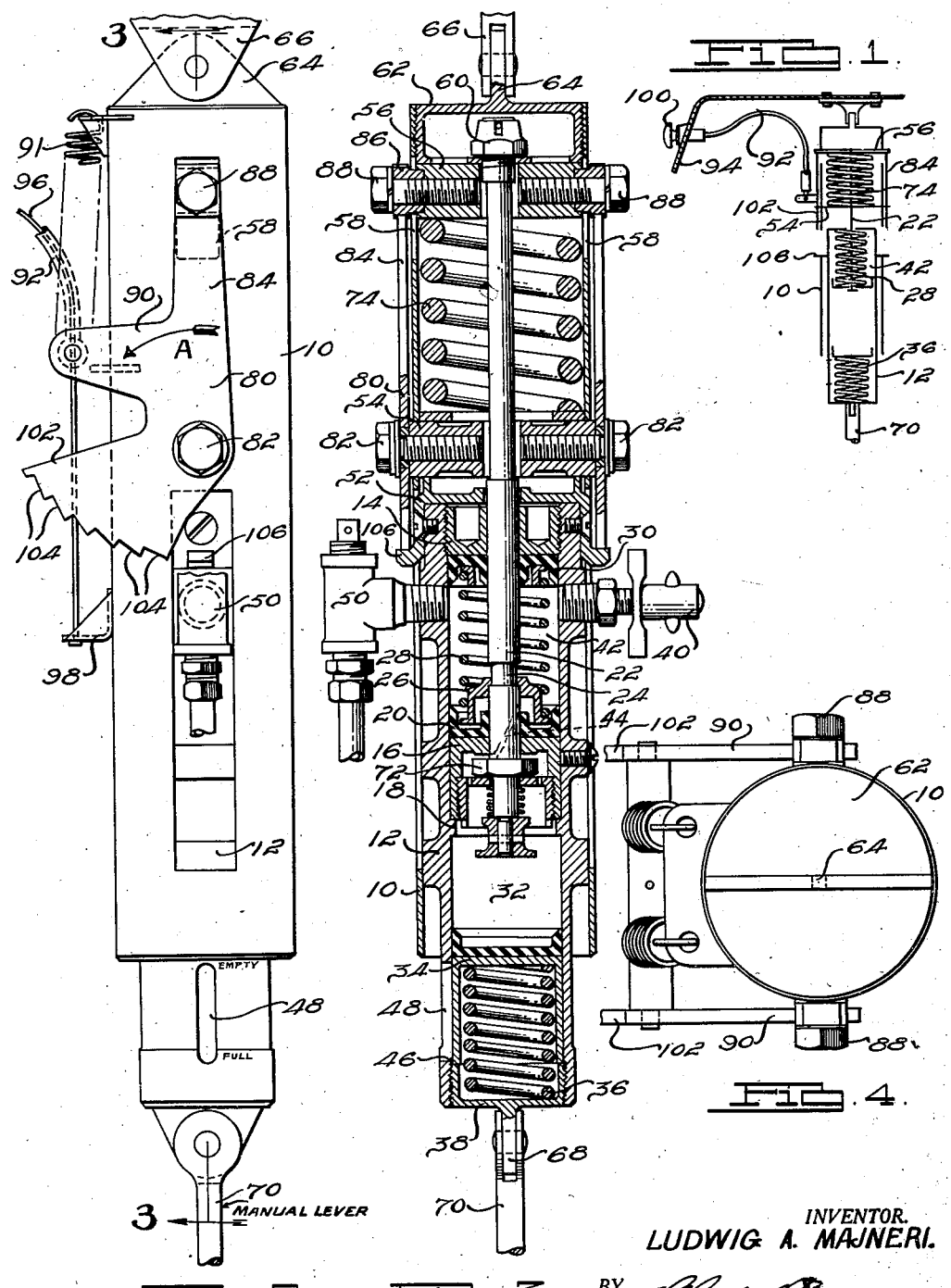

Patented Apr. 26, 1938

2,115,174

UNITED STATES PATENT OFFICE 2,115,174

FLUID PRESSURE CONTROL MECHANISM

Ludwig A. Majneri, Detroit, Mich.

Application October 6, 1933, Serial No. 692,508

6 Claims. (Cl. 60—54.6)

This invention relates to a fluid pressure control mechanism and is specifically illustrated as embodied in a control mechanism for hydraulic brakes, particularly applicable to airplanes.

One object of this invention is to provide a mechanism which will permit instant application of the brakes by the operator and to retain the mechanism in applied position after the operator has released the operating mechanism.

Another object of the invention is to provide a holding mechanism which may be quickly released, thereby instantly releasing the fluid pressure on the brakes.

Other objects and advantages of the invention will more fully appear from the following description taken in connection with the accompanying drawings, in which:

Fig. 1 is a diagrammatic view illustrating the salient features of the invention and its application to a support.

Fig. 2 is a side elevation of the device shown in normal position.

Fig. 3 is a sectional view taken on line III—III of Fig. 2.

Fig. 4 is an end view of my improved mechanism shown in Figs. 1, 2, and 3.

Fig. 5 is a view corresponding to Fig. 2 but showing the parts in an operated position.

Fig. 6 is a side elevation of the parts shown in Fig. 5.

Referring to the drawings, I have shown a casing or sleeve member 10 which extends substantially the length of the mechanism. A cylindrical member 12 is mounted in the sleeve 10 for reciprocation and is provided with a closed end which consists of a plug 14. The cylindrical member 12 is provided with a piston 16. Reciprocably mounted thereon is a shoulder 18 forming a stop limiting the outward movement of the piston 16 in the cylindrical member 12. A packing member 20 is provided on a piston rod 22 which extends through the plug 14. An annular recess 24 is provided in the piston rod to receive a split washer 26 which forms an abutment for a coil spring 28 positioned between the split washer 26 and a packing member 30 abutting against the plug member 14. Outwardly beyond the shoulder 18 is provided a chamber 32 having a piston 34 therein which is resiliently urged inwardly by a coil spring 36 abutting against a cap member 38 which closes the outer end of the cylindrical member 12. A fitting 40 is provided in the wall of the cylindrical member 12 which affords a communication to the pressure chamber 42. Fluid is supplied through this fitting 40 into the chamber 42, preferably lubricant such as commonly used in hydraulic cylinders. The lubricant in this chamber is fed through an opening 44 in the piston rod 22 through holes 43 in the piston 16 into the reserve chamber 32. When the reserve chamber 32 is empty the piston 34 is extended inwardly with the bottom edge 46 showing through a slot 48, indicating the position of the piston 34, and consequently the amount of fluid in the reserve chamber 32. As more lubricant is supplied through the fitting 40 the piston 34 moves outwardly against the resistance of the spring 36 until the end of the piston 46 strikes the cap member 38. It will thus be understood that at all times the reserve chamber 32 is under a slight pressure caused by the spring 36 resiliently urging the piston 34 inwardly.

When an extending force is applied the cylindrical member 12 and all parts integral with it move in relation to sleeve 10 which is attached to the structure and in relation to all parts which are prevented from axial movement in relation to sleeve 10, including piston rod 22 and piston 16. This motion tends to decrease the volume of chamber 42, causing a rapid rise of pressure in chamber 42 when the mechanism is in operation. The area of the passage 44 is made sufficiently small so that the pressure in chamber 42 rises faster than the fluid can escape through passage 44 into chamber 32. This pressure rise causes cup 20 and piston 16 to move axially forcing the piston against 72 thereby closing the passage 44.

A fitting 50 is provided on the side of the cylinder member 12 opposite to the fitting 40 for conducting the fluid pressure from the chamber 42 to any operating mechanism, such as hydraulic brakes.

Adjacent the inner end of the cylindrical member 12 is a fitting 52 which carries a transverse member 54. The transverse member 54 extends through the wall of the sleeve member 10 and moves therewith during the relative movement of the sleeve member 10 and the cylindrical member 12. Another transverse member 56 is provided in the sleeve 10 at its outer end. This transverse member has relative movement with the sleeve 10, there being provided slots 58 which permit the member 56 to move axially relative to the sleeve 10. The piston rod 22 is provided at its outer end with a nut 60 which acts as an adjustable stop limiting the outward movement of the member 56. The outer end of the sleeve 10 is provided with a cap 62 having a projection 64 which may be secured to a support 66. The cap 38 is provided with an extension 68 to which is secured an operating lever 70.

When the cylindrical member 12 is moved relative to the sleeve 10, for example, by a pull on the operating lever 70, it will be understood that the pressure chamber 42 is reduced in volume by the relative movement of the piston 16 and cylindrical member 12. During this movement the opening 44 in the piston rod 22 is closed by the limited lost motion between a shoulder 72 on the rod 22 and the piston 16. As the closed end of the cylindrical member moves toward the piston 16 the resistance is taken through the piston 16, piston rod 22, transverse member 56, arms 84, transverse member 54, and thence through the sleeve 10 to the support 66.

When the member 80 is in the position as shown in Figs. 5 and 6 the resistance is taken through the piston 16, piston rod 22, transverse member 56 to a relatively stiff spring 74, and from there to the transverse member 54, and thence through the sleeve 10 to the support 66.

Two members 80 are pivotally mounted on the transverse member 54 held in place by a nut 82 screw threaded in a member 54. The two members 80 each comprises an arm 84 which extends from the pivoted support at 82 to a member 86 carried by the transverse member 56. The member 86 is held in place by a bolt 88 screw threaded into the member 56. One of these levers 80 is provided at the opposite sides of the cylindrical member 12, and for the purpose of description only one lever will be described, the other one being a duplicate of the first.

During normal operation of this device the arm 84 remains in the position shown on the drawings forming a rigid connection between the transverse members 54 and 56, causing the spring 74 to be inert. Another arm 90 is provided on the member 80 to receive a control mechanism. This control mechanism consists of a flexible tubular member 92 secured to a support, such as the instrument board 94 and the arm 90. A wire 96 is extended through the instrument board and the flexible tube 92. One end of the wire is secured to a support 98 on the sleeve 10 and the opposite end of the wire is provided with an operating knob or handle 100. Referring to Fig. 1, it will be noted that the flexible tubing and wire takes a curved position so that when the rod is pulled by grasping the handle 100 the curve is shortened, thereby effectively lengthening the flexible tube 92 and forcing the arm 84 in a direction indicated by the arrow A in Fig. 2. This movement throws the arm 84 away from the arm 86, thereby permitting operation through the flexible spring 74.

On the opposite side of the pivot 82 I have provided another extension 102 consisting of a plurality of portions 104 located at varying lengths from the pivot 82. These portions 104 are normally in the position shown in Fig. 2 but when the lever 80 is swung in the direction indicated by the arrow A one of the portions 104 engages a projection 106 on the cylinder 12, as shown in Fig. 6. By this mechanism I have provided a variable stop which prevents return movement of the piston relative to the cylindrical member 12, providing a means for varying the return stroke of the piston, thus permitting the operator to maintain the brakes applied without manual operation. When the arm 102 is in a position so that one of the portions 104 engages the stop 106 the spring 74 is in operation, urging with a great deal of force the piston away from the outer end of the cylindrical member. The moment pressure is applied through the control 70 the piston 16 moves relative to the cylindrical member 12, thereby releasing the pressure of the stop 106 on one of the projections 104 and the spring 91 returns the lever 80 to its normal position, as indicated on the drawings in Fig. 2. The spring 74 then releases the brakes.

During the operation of the device the pressure in the chamber 42 is created by pulling on the control 70 which may be attached to any suitable connection (not shown). The pull is transmitted through the cylindrical member 12 and sleeve 10. The force applied on the control 70 is transmitted to the piston 16 by means of the liquid in 42 and spring 28, and from 16 by 22, 60, 56, 84, 54 to 10 and to the fixed support 66. If it is desired to retain the fluid under pressure in the chamber 42 the arm 84 is swung out of the path of the member 56 and the arm 102 is swung into the path of the stop 106 when the chamber 42 is under pressure. Such movement of the arms 80 and 84 causes the pull to be taken through the heavy coil spring 74, the transverse member 56 moving relative to the sleeve in the slots 58. When the arm 102 is returned to its normal position the heavy spring 74 immediately releases the pressure in the chamber 42.

The reserve chamber 32 between the piston 34 and piston 16 is under a slight pressure caused by the compression spring 36 urging the piston 34 inwardly. As the amount of fluid in the chamber 32 is reduced the piston 34 moves inwardly with its open end 46 showing through the slot 48; thus the position of the piston indicates the amount of fluid in the reserve chamber 32.

It will be understood that various changes, including the size, shape and arrangement of parts may be made without departing from the spirit of my invention. The use of the mechanism may be applied to various devices other than hydraulic brakes and it is not my intention to limit the scope of my invention other than by the terms of the appended claims.

What I claim is:

1. In a fluid pressure control mechanism, the combination of a sleeve, of a cylindrical member having a closed inner end reciprocable in said sleeve, a piston in said cylindrical member forming a fluid chamber between said piston and the closed inner end of said cylindrical member, a piston rod extending through said fluid chamber and the closed end of said cylindrical member, an outer transverse member carried by said rod limited for axial movement relative to said sleeve in one direction but free for relative movement in an opposite direction, an inner transverse member carried by said sleeve, resilient means between said inner and outer transverse members, and means for preventing axial movement of the transverse members.

2. In a fluid pressure control mechanism, the combination of a sleeve, of a cylindrical member having a closed inner end reciprocable in said sleeve, a piston in said cylindrical member forming a fluid chamber between said piston and the closed inner end of said cylindrical member, a piston rod extending through said fluid chamber and the closed end of said cylindrical member, an outer transverse member carried by said rod limited for axial movement relative to said sleeve in one direction but free for relative movement in an opposite direction, an inner transverse member carried by said sleeve, resilient means between said inner and outer transverse members, a stop carried by said cylindrical member extending through said sleeve having relative movement therewith, and means for limiting the amount of relative movement between said stop and said sleeve.

3. In a fluid pressure control mechanism, the combination of a sleeve, of a cylindrical member having a closed inner end reciprocable in said sleeve, a piston in said cylindrical member forming a fluid chamber between said piston and the closed inner end of said cylindrical member, a piston rod extending through said fluid chamber and the closed end of said cylindrical member, an outer transverse member carried by said rod limited for axial movement relative to said sleeve in one direction but free for relative movement in an opposite direction, an inner transverse member carried by said sleeve, resilient means between said inner and outer transverse members, means for preventing axial movement of transverse members, a stop carried by said cylindrical member extending through said sleeve having relative movement therewith, and means for limiting the amount of relative movement between said stop and said sleeve.

4. In a fluid pressure control mechanism, the combination of a cylindrical member, of a piston within said cylindrical member forming a fluid chamber between the piston and the end of said cylindrical member, a piston rod connected to said piston extending through the end of said cylindrical member and therebeyond, an abutment on the end of said rod, a member between the end of said cylindrical member and said abutment, resilient means between said abutment and said member, an arm pivotally mounted on said member having an extension on one side of its pivot for engagement with said abutment and an extension on the other side of its pivot for engagement with said cylindrical member, and means for swinging said arm about its pivot to position the extensions, one between said abutment and said member, or the other between said member and said cylindrical member.

5. In a fluid pressure control mechanism, the combination of a cylindrical member, of a piston within said cylindrical member forming a fluid chamber between the piston and the end of said cylindrical member, a piston rod connected to said piston extending through the end of said cylindrical member and therebeyond, an abutment on the end of said rod, a member between the end of said cylindrical member and said abutment, resilient means between said abutment and said member, an arm pivotally mounted on said member having portions located at varying distances from its pivot each portion adapted for engagement with said cylindrical member, and means for swinging said arm to position any selected portion between said member and said cylindrical member.

6. In a fluid pressure control mechanism, the combination of a housing having a sleeve-like portion and a crosshead portion, of a cylindrical member within said sleeve-like portion having a closed end and mounted for relative axial movement therewith, a rod and a piston within said cylindrical member, said rod extending through the closed end of said cylindrical member and through the crosshead portion of said housing, a fluid chamber in said cylindrical member between the closed end of the cylindrical member and said piston, a resilient means between said piston and the closed end of said cylindrical member for moving said cylindrical member relative to said housing, and means carried by said housing and said cylindrical member for holding said piston and said cylindrical member in a predetermined relative position and preventing movement of said piston by said resilient means.

LUDWIG A. MAJNERI.